United States Patent [19]

Sekino et al.

[11] Patent Number: 5,632,157
[45] Date of Patent: May 27, 1997

[54] ELECTRIC AUTOMOBILE

[75] Inventors: Hirokazu Sekino; Issei Yamakoshi, both of Suwa, Japan

[73] Assignee: Seiko Epson Corporation, Nagano-ken, Japan

[21] Appl. No.: 550,685

[22] Filed: Oct. 31, 1995

Related U.S. Application Data

[62] Division of Ser. No. 248,770, May 25, 1994, Pat. No. 5,488,837, which is a division of Ser. No. 148,180, Nov. 5, 1993, Pat. No. 5,345,777, which is a continuation of Ser. No. 809,537, filed as PCT/JP91/00656 May 17, 1991 abandoned.

[30] Foreign Application Priority Data

| May 24, 1990 | [JP] | Japan | 2-134642 |
| Nov. 20, 1990 | [JP] | Japan | 2-315431 |
| Nov. 20, 1990 | [JP] | Japan | 2-315432 |

[51] Int. Cl.⁶ .................................................. B60H 1/32
[52] U.S. Cl. ................... 62/244; 180/65.5; 310/54
[58] Field of Search ........................ 62/239, 244, 324.1; 310/54, 57; 180/65.5, 242, 308

[56] References Cited

U.S. PATENT DOCUMENTS

| 1,830,457 | 11/1931 | Apple | 310/54 |
| 4,307,575 | 12/1981 | Popinski | 62/148 |
| 4,862,705 | 9/1989 | Nakamura et al. | 62/324.1 |
| 4,934,158 | 6/1990 | Sakano | 62/239 |
| 5,127,485 | 7/1992 | Wakuta et al. | 180/65.5 |

*Primary Examiner*—William E. Tapolcai
*Attorney, Agent, or Firm*—Ladas & Parry

[57] ABSTRACT

An electric automobile comprises a wheel driving motor (8, 10, 15, 21, 50, 80) and a refrigerating system for air-conditioning the interior of an electric automobile. The refrigerating system has a compressor (7, 22, 57), an outdoor heat exchanger (6, 25, 53), an expansion valve (3a, 3b, 13, 27, 28, 55, 58), and an indoor heat exchanger (4, 29, 54) connected in series by a refrigerant pipe. The wheel driving motor (8, 10, 15, 21, 50, 80) is provided within the refrigerating system, and the wheel driving motor is cooled directly by the refrigerating system.

6 Claims, 12 Drawing Sheets

ELECTRIC AUTOMOBILE

This is a divisional of application(s) Ser. No. 08/248,770 filed May 25, 1994 (now U.S. Pat. No. 5,448,837) which is a Divisional of application Ser. No.: 08/148,180 filed Nov. 5, 1993 (now U.S. Pat. No. 5,345,777) which is a continuation of application Ser. No.: 07/809,537 filed Jan. 23, 1992 now abandoned; and International Application PCT/JP91/00656 filed on May 17, 1991 and which designated the U.S.

FIELD OF THE INVENTION

The present invention relates to an electric automobile having a wheel driving motor, and in particular to an electric automobile whose wheel driving motor is effectively cooled.

BACKGROUND OF THE INVENTION

In general, an electric automobile has a wheel driving motor. This type of an electric automobile has lately attracted considerable attention, because such an electric automobile is said to solve greenhouse effect problems and air pollution problems caused by exhaust gases containing carbon dioxide from current internal combustion engine type automobiles.

However, both the power and the torque of an electric automobile are considerably less than those of the internal combustion engine type automobile. Furthermore the distance range of the electric automobile per one charge cannot be said to be sufficient because of the low efficiency of the wheel driving motor and the small capacity of the battery of the electric automobile.

As the power output of the wheel driving motor increases, the quantity of heat generated by the wheel driving motor also is increased, so that coils of the wheel driving motor may burn because of an abnormal temperature rise of the motor and the motor efficiency of the wheel driving motor may decrease because of magnetization reduction of the magnet. Accordingly, the efficient cooling of the wheel driving motor in order to maintain the efficiency of an electric automobile has been a great problem.

A new cooling apparatus for cooling the wheel driving motors of an electric automobile has been developed. This cooling apparatus uses cool air generated by an air conditioner of the automobile. Such an air conditioner uses a refrigerant.

The cooling apparatus has an air pipe, a damper and a fan, which convey one part of the cool air for cooling the interior of the automobile to the front and rear wheel driving motors.

In this cooling apparatus, the sufficiently cool air may be conveyed to the front wheel driving motor, because the air conditioner is generally provided at the side of the front wheel of the automobile. However, the cool air conveyed to the rear wheel driving motor may be heated before reaching the rear wheel driving motor, because of the length of the air pipe to the rear wheel driving motor. Therefore, the rear wheel driving motor cannot be sufficiently cooled.

Both the front and rear wheel driving motors also cannot be sufficiently cooled when the cool air cools only the surfaces of the front and rear wheel driving motors. Furthermore, the cooling apparatus is in need of a large fan having a large volumetric delivery in order to convey the cool air to the rear wheel driving motor, which causes problems in that a large power consumption is required.

SUMMARY OF THE INVENTION

It is therefore an object of the present invention to provide an electric automobile which can easily and efficiently cool one or more wheel driving motors.

The foregoing object is accomplished by providing an electric automobile comprising:
  one or more wheel driving motors for the driving wheels of the electric automobile; and
  a refrigerating system in which a refrigerant flows, having a compressor, an outdoor heat exchanger, an expansion value, and an indoor heat exchanger connected one after another by refrigerant pipeing,
  the wheel driving motor being provided within the refrigerating system, whereby the wheel driving motor is efficiently cooled by the refrigerant.

According to the present invention, since each wheel driving motor is cooled directly by the refrigerant, the wheel driving motor is efficiently cooled.

PREFERRED EMBODIMENTS OF THE INVENTION

§1 First Embodiment of Electric Automobile

1.1 Basic Structure

Figure 1:
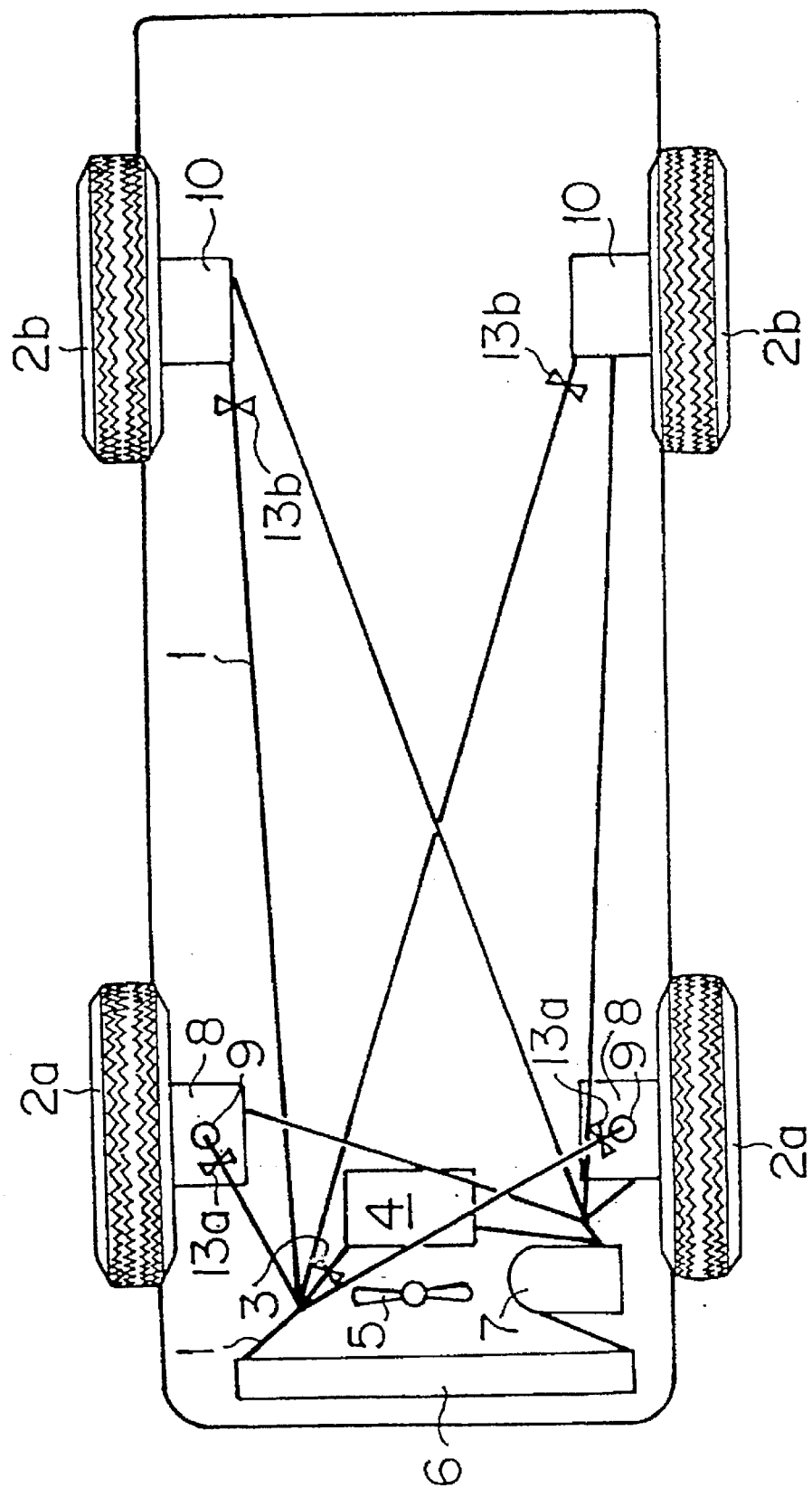
FIG. 1 is a schematic plane view showing an electric automobile according to a first embodiment of the present invention.

FIG. 1 is a plan view showing an electric automobile according to a first embodiment of the present invention. In FIG. 1, a refrigerating system is provided in the electric automobile. The refrigerating cycle has a compressor 7, an outdoor heat exchanger 6, an expansion valve 3, and an indoor heat exchanger 4, which are connected in series by a refrigerant piping 1. In this refrigerating system, after being cooled by the outdoor heat exchanger 6, a compression refrigerant (such as Freon) is distributed into wheel driving motors 8 of front wheels 2a of the electric automobile and wheel driving motors 10 of rear wheels 2b by the refrigerant piping 1 before entering the indoor heat exchanger 4. This distribution of the compression refrigerant may be performed by only diverging the refrigerant piping 1. However, when a distributor is used for distributing the compression refrigerant, the amounts of the compression refrigerant distributed by the distributor become more accurately equal to each other, so that the difference between the cooling efficiencies of the wheel driving motors 8 and 10 becomes smaller. Expansion valves 13a, 13b are provided in the diverged refrigerant piping 1 just before wheel driving motors 8 and 10. The refrigerant is adiabatically expanded by the expansion valves 3, 13a, and 13b which are located just before the indoor heat exchanger 4 and the wheel driving motors 8 and 10, and then the refrigerant flows into the interiors of the indoor heat exchanger 4 and the wheel driving motors 8 and 10. The refrigerant cools the interior of the automobile as well as the interiors of the wheel driving motors 8 and 10. In FIG. 1, reference numeral 5 indicates a fan.

Figure 2:
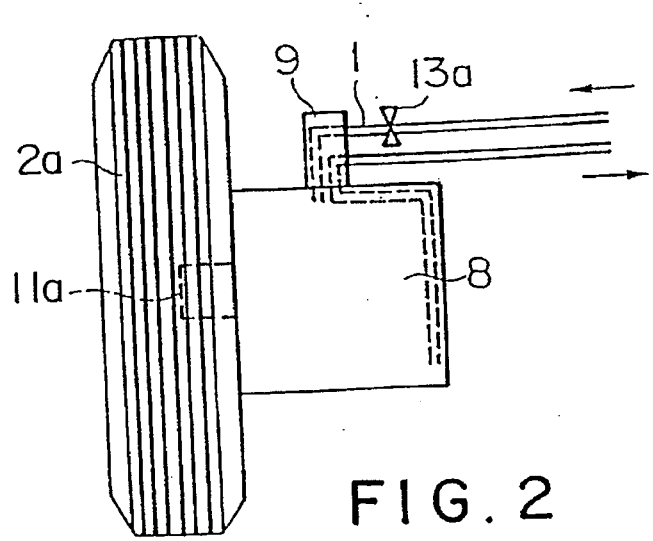
FIG. 2 is a side view showing a front wheel driving motor of the electric automobile shown in FIG. 1.
Figure 3:
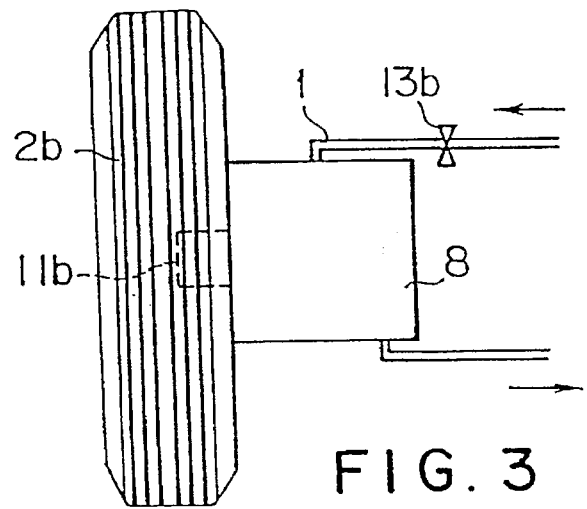
FIG. 3 is a side view showing a rear wheel driving motor of the electric automobile shown in FIG. 1.

As shown in FIG. 2, the refrigerant piping 1 for the front wheel 2a are provided on the wheel driving motor 8 and pass through the inside of a steering shaft 9 of the front wheel 2a in order to not interfere with a steering mechanism (not shown). In FIG. 2, reference numeral 11a indicates a main shaft of the wheel driving motor 8. On the other hand, as shown in FIG. 3, the refrigerant piping 1 for the rear wheel 2b may be provided anywhere as long as the pipes 1 do not interfere with the rotation of the rear wheel 2, because the rear wheel 2b does not require any steering mechanism. In FIG. 3, reference numeral 11b indicates a main shaft of the wheel driving motor 10.

Then inlets of the refrigerant piping 1 are positioned above the outlets thereof in both the wheel driving motors 8 and the wheel driving motors 10 in order to smooth the flow of the refrigerant so that the wheel driving motors 8 and 10 may be positively and entirely cooled.

The refrigerant is heated by heat exchange with the wheel driving motors 8 and 10 in this manner. After that, the refrigerant flows into the compressor 7 and is then adiabatically compressed by the compressor 7 to a high temperature and a high pressure. Next the refrigerant flows into the outdoor heat exchanger 6. The wheel driving motors 8 and 10 can be effectively cooled by repeating these steps, whether the wheel driving motors 8 and 10 are operated or not. Therefore, overheating damage to the motor coils caused by abnormal generation of heat and the reduction of motor efficiencies caused by magnetization reduction can be prevented. At the same time, the cooling operation of the interior of the automobile can be performed by the indoor heat exchanger 4.

1.2 Variation of Structure

Next, a variation of the electric automobile according to the first embodiment of the present invention will be described with reference to FIG. 4.

Figure 4:
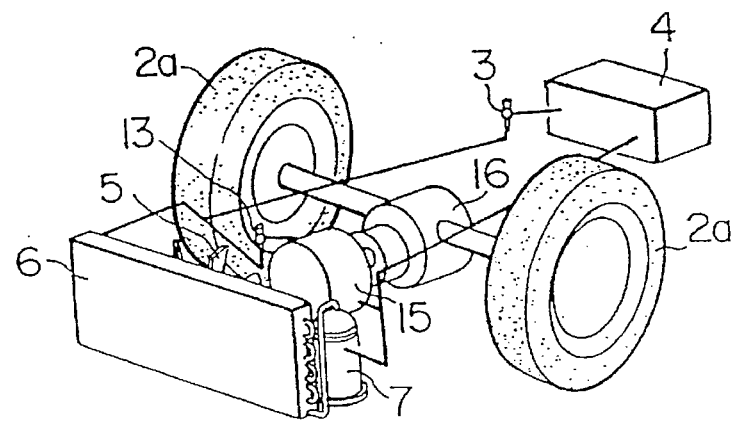
FIG. 4 is a perspective view showing an electric automobile according to a variation of the first embodiment.

The same reference numerals are used in FIG. 4 in parts corresponding to those in FIG. 1, and detailed descriptions of these parts are omitted.

In the variation of the electric automobile shown in FIG. 4, one wheel driving motor 15 is provided for two front wheels 2a, the driving force of the wheel driving motor 15 being transmitted to the two front wheels 2a by a transmission 16. Other parts of the automobile shown in FIG. 4 are substantially the same as those shown in FIG. 1.

In FIG. 4, the refrigerant is compressed by the compressor 7 and cooled by the outdoor heat exchanger 6, and then the refrigerant is distributed to the side of the indoor heat exchanger 4 and the side of the wheel driving motor 15 respectively. The refrigerant distributed to the side of the indoor heat exchanger 4 is adiabatically expanded by the expansion value 3 located just before the indoor heat exchanger 4 and then flows into the indoor heat exchanger 4. Next, the refrigerant cools the air around the indoor heat exchanger 4 and then returns to the compressor 7. The air around the indoor heat exchanger 4 flows into the interior of the electric automobile. On the other hand, the refrigerant distributed to the side of the wheel driving motor 15 is adiabatically expanded by an expansion valve 13 positioned just before the wheel driving motor 15 and then flows into the wheel driving motor 15. Thereafter, the refrigerant cools the wheel driving motor 15 and then returns to the compressor 7.

§2 Second Embodiment of Electric Automobile

2.1 Basic Structure

Figure 5:
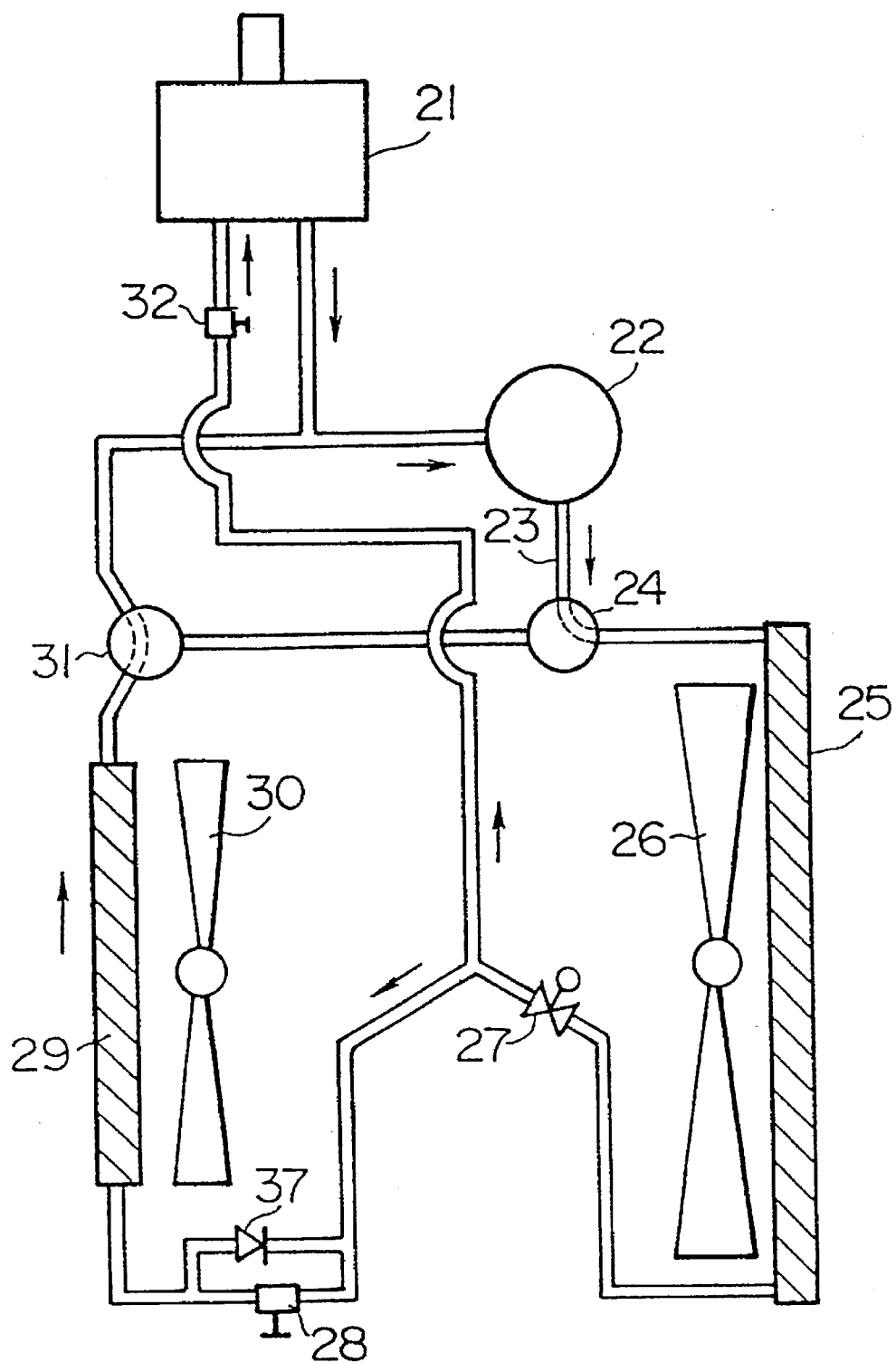
FIG. 5 is a systematically schematic view showing a refrigerating system in a cooling mode of an electric automobile according to a second embodiment of the present invention.
Figure 6:
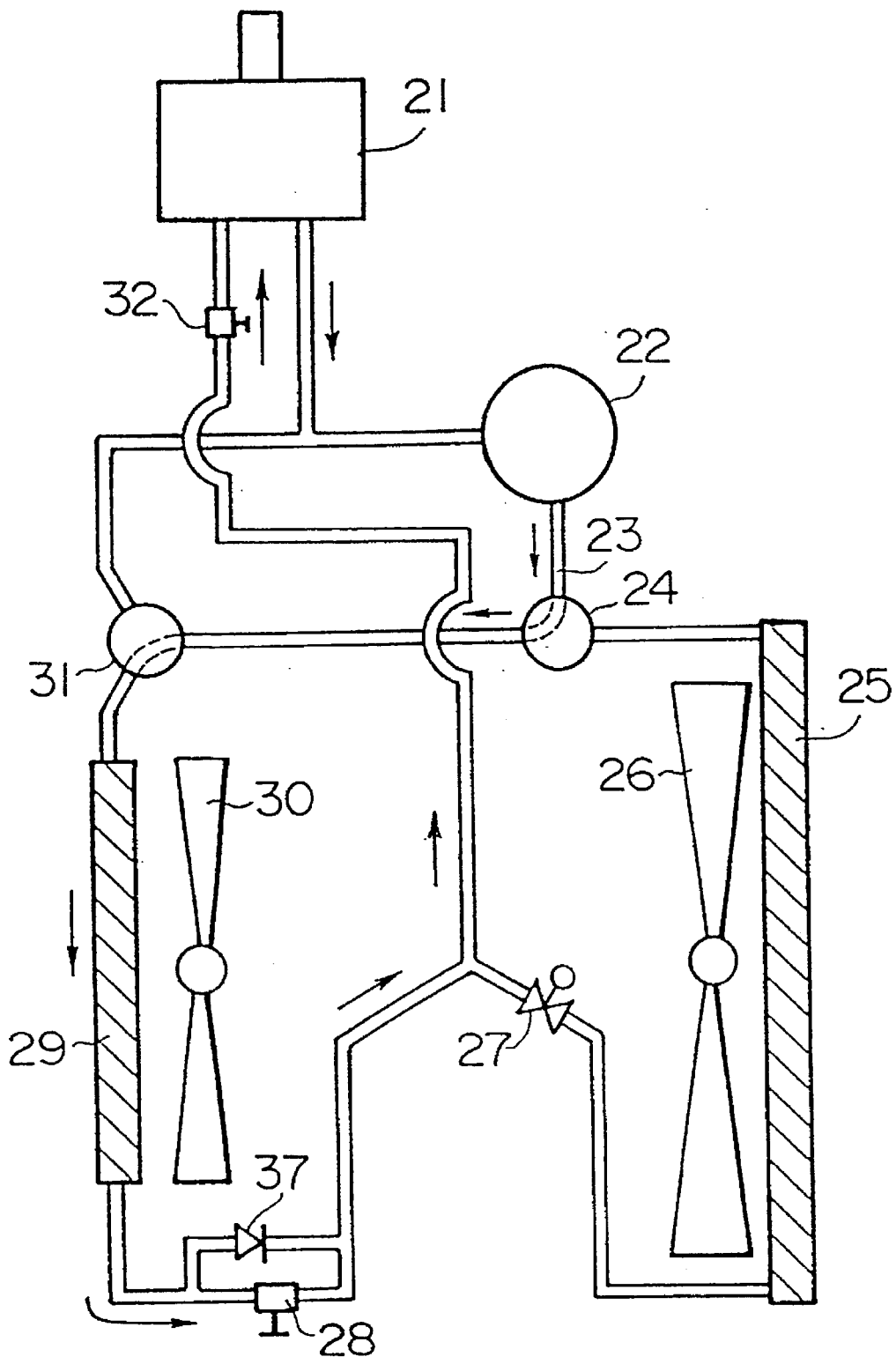
FIG. 6 is a schematic view of a system, showing the refrigerating system of FIG. 5 in a heating mode.
Figure 7:
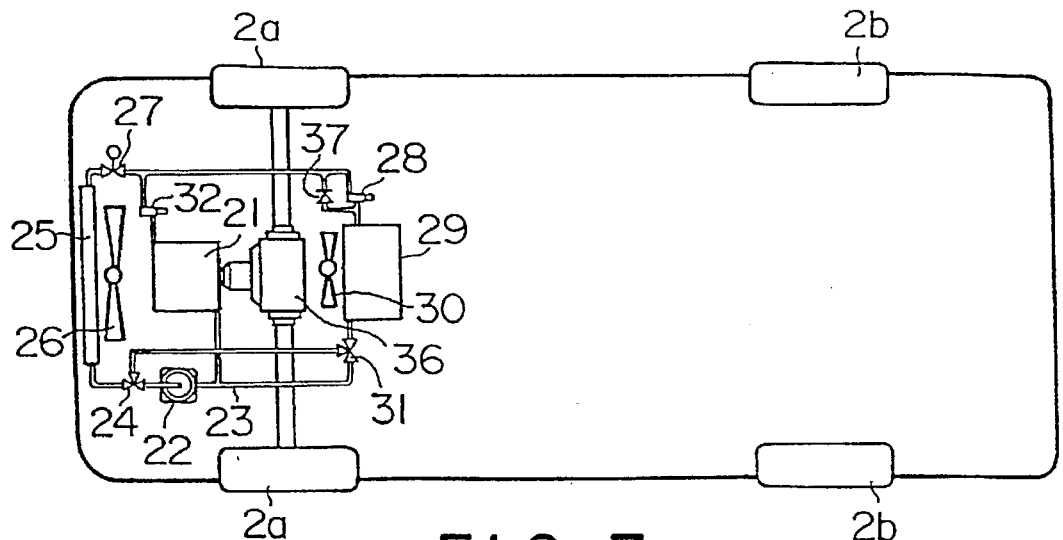
FIG. 7 is a general schematic plane view showing the electric automobile according to a second embodiment of the present invention.

FIGS. 5, 6, and 7 show an electric automobile according to a second embodiment of the present invention. FIG. 5 in particular shows a heat pump type (reversible type) refrigerating system of the electric automobile in a cooling mode. FIG. 6 shows the heat pump type refrigerating system in a heating mode, and FIG. 7 shows a general plan view of the electric automobile.

In FIGS. 5 and 7, the refrigerating system of the electric automobile is set in the cooling mode. A gaseous refrigerant (such as Freon) is compressed by a compressor 22 to a high temperature and a high pressure. The gaseous refrigerant flows through a refrigerant pipe 23, and then flows into an outdoor heat exchanger 25 through a change-over valve 24. In the cooling mode (FIG. 5), the outdoor heat exchanger 25 functions as a condenser, and is ventilated with a cooling fan 26.

The gaseous refrigerant is cooled by the outdoor heat exchanger 25 to become low-temperature and high-pressure liquid refrigerant. As a magnetic valve 27 is open all the way in the cooling mode, the liquid refrigerant is distributed to a side of an indoor heat exchanger 29 for air-conditioning the automobile and a side of a wheel driving motor 21. In this case the indoor heat exchanger 29 functions as an evaporator. Next the liquid refrigerant is adiabatically expanded by an indoor heat exchanger expansion valve 28 located just before the indoor heat exchanger 29, to become low-temperature and low-pressure gaseous and liquid refrigerant. Then the gaseous and liquid refrigerant flows into the indoor heat exchanger 29 and cools the air around the indoor heat exchanger 29. The air around the indoor heat exchanger 29 thus cooled by the gaseous and liquid refrigerant is blown into the interior of the electric automobile by a fan 30. On the other hand, the gaseous and liquid refrigerant is heated at the indoor heat exchanger 29 to return into a gaseous refrigerant, which then flows to a compressor 22 through a change-over valve 31 as shown in FIG. 5.

On the other hand, the liquid refrigerant flowing to the side of the wheel driving motor 21, is adiabatically expanded by a motor expansion valve 32, located just before the wheel driving motor 21, to become a gaseous and liquid refrigerant. Next, the refrigerant flows to the wheel driving motor 21 and then cools the wheel driving motor 21. In this case, the wheel driving motor 21 can be cooled rapidly and efficiently because the wheel driving motor in itself functions as an evaporator. The gaseous and liquid refrigerant is heated by the wheel driving motor 21 to return into a gaseous refrigerant, which then flows to the compressor 22. Next the gaseous refrigerant is compressed by the compressor into a state of a high temperature and a high pressure, and then the gaseous refrigerant flows again to the outdoor heat exchanger 25 through the change-over valve 24. Thereafter, the steps described above are repeated.

As shown in FIG. 7, the driving force of the wheel driving motor 21 is transmitted to the front wheels 2a through a transmission 36 in order to drive the electric automobile. In FIG. 7, reference numeral 2b indicates the rear wheels.

Next, the refrigerating system of the electric automobile in the heating mode will be described below with reference to FIG. 6.

In the heating mode, the gaseous refrigerant is compressed by the compressor 22, and then flows to the indoor heat exchanger 29 through the change-over valves 24 and 31, as shown in FIG. 6. In this case the indoor heat exchanger 29 functions as a condenser. The gaseous refrigerant is cooled by the cool air around the indoor heat exchanger 29 to become a low-temperature and high-pressure liquid refrigerant. Next, the liquid refrigerant flows to the wheel driving motor 21 through a check valve 37. In this case, the liquid refrigerant does not flow to the side of the outdoor heat exchanger 25 because the magnetic valve 27 is fully closed.

The liquid refrigerant which flows to the side of the wheel driving motor 21 in this manner is adiabatically expanded by the expansion valve 32, installed just before the wheel driving motor 21, to become a gaseous and liquid refrigerant. Next, this gaseous and liquid refrigerant cools the wheel driving motor 21. In this case, the wheel driving motor 21 can be cooled efficiently and rapidly because the wheel driving motor 21 in itself functions as an evaporator. The gaseous and liquid refrigerant is heated by the wheel driving motor 21 to return into a gaseous refrigerant. This gaseous refrigerant flows to the compressor 22 and is then compressed to a state of a high temperature and a high pressure. Thereafter, the gaseous refrigerant flows again to the indoor heat exchanger 29 through the change-over valves 24 and 31. The steps described above are then repeated. Both the air-conditioning of the interior of the electric automobile and the cooling of the wheel driving motor are performed by arranging the wheel driving motor within the heat pump type refrigerating system. An economical electric automobile can therefore be obtained.

2.2 Variations of Structure

Next, one variation of the electric automobile according to the second embodiment of the present invention will be described with reference to FIG. 8.

Figure 8:
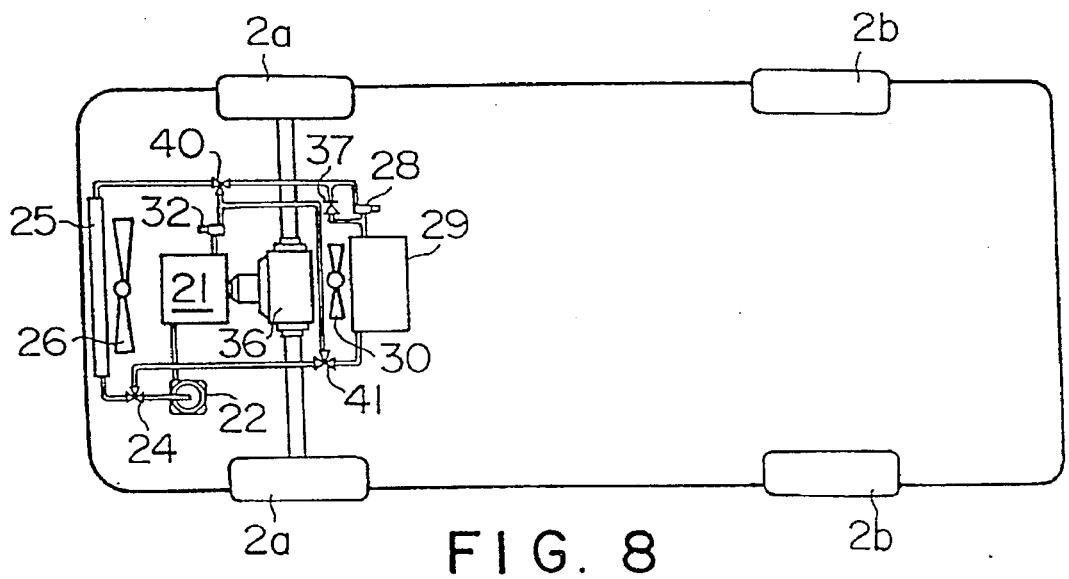
FIG. 8 is a general schematic plane view showing an electric automobile according to a variation of the second embodiment.

The same reference numerals are used in FIG. 8 for parts corresponding to those in FIG. 7, and detailed descriptions of these parts are omitted.

In the variation of the electric automobile shown in FIG. 8, a gaseous refrigerant is compressed by the compressor 22 and then flows to the outdoor heat exchanger 25 to become a liquid refrigerant through the change-over valve 24 in the cooling mode. Next, the liquid refrigerant flows through a change-over valve 40 and is then adiabatically expanded by the indoor heat exchange expansion valve 28 to become a gaseous and liquid refrigerant. Thereafter this gaseous and liquid refrigerant flows into and cools the indoor heat exchanger 29. In this case, the gaseous and liquid refrigerant is not completely evaporated within the indoor heat exchanger 29. Next, the gaseous and liquid refrigerant flows into the wheel driving motor 21 in series through a change-over valve 41. The gaseous and liquid refrigerant is completely evaporated within the wheel driving motor 21 to become a gaseous refrigerant, which then returns to the compressor 22. In this case, the motor expansion valve 32 is fully open.

On the other hand, in the heating mode, the gaseous refrigerant is compressed by the compressor 22 and then flows to the indoor heat exchanger 29 through the change-over valve 24 and 41 (FIG. 8). The refrigerant heats the air around the indoor heat exchanger 29 to become a low-temperature liquid refrigerant. This liquid refrigerant flows through the check valve 37 and the change-over valve 40 and is then adiabatically expanded by the motor expansion valve 32 to become a gaseous and liquid refrigerant. Thereafter the gaseous and liquid refrigerant cools the wheel driving motor 21 to become a gaseous refrigerant, which then returns to the compressor 22.

Figure 9:
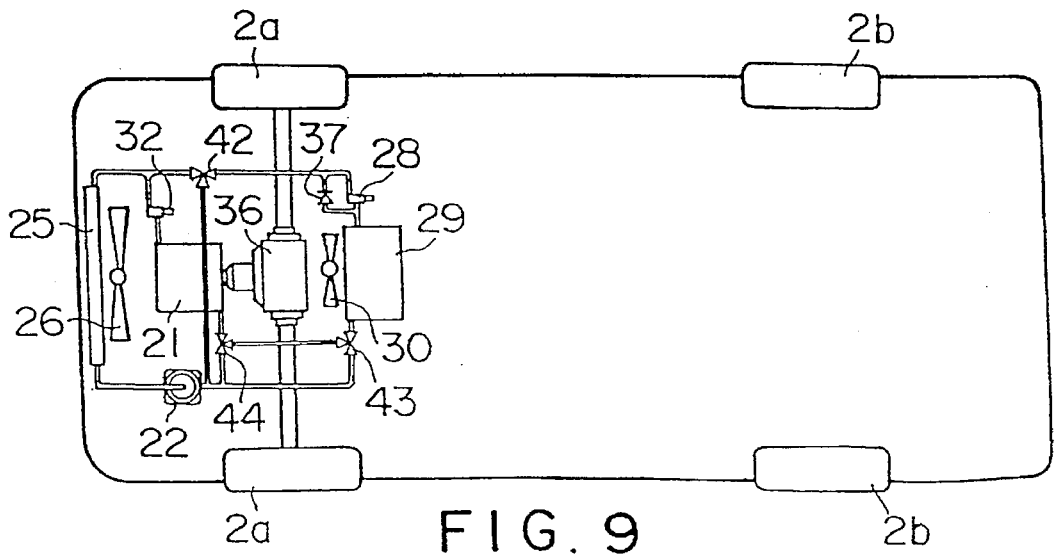
FIG. 9 is a general schematic plane view showing an electric automobile according to another variation of the second embodiment.

Next, another variation of the electric automobile is shown in FIG. 9. In FIG. 9, in the cooling mode, a gaseous refrigerant is compressed by the compressor 22 and then flows into the outdoor heat exchanger 25 to become a liquid refrigerant. This liquid refrigerant is adiabatically expanded by the indoor heat exchanger expansion valve 28 to become a gaseous and liquid refrigerant, which then cools the air around the indoor heat exchanger 29. At the same time, after passing through the outdoor heat exchanger 25, the liquid refrigerant flows into the motor expansion valve 32 in parallel. The liquid refrigerant is adiabatically expanded by the motor expansion valve 32 to become a gaseous and liquid refrigerant. Next this gaseous and liquid refrigerant cools the wheel driving motor 21. The refrigerant that has passed through the indoor heat exchanger 29 and the refrigerant that has passed through the wheel driving motor 21, both return to the compressor 22 through the change-over valves 43 and 44 respectively.

In FIG. 9, in the heating mode, a gaseous refrigerant is compressed by the compressor 22 and then passes through the outdoor heat exchanger 25 to become a liquid refrigerant. This liquid refrigerant is caused to flow only to the motor expansion valve 32 by changing over the change-over valve 42. The liquid refrigerant is adiabatically expanded by the motor expansion valve 32 and then cools the wheel driving motor 21. The refrigerant heated by the wheel driving motor 21 flows to the indoor heat exchanger 29 through the change-over valves 44 and 43. Next, the refrigerant heats the air around the indoor heat exchanger 29 and then returns to the compressor 21 through the check valve 37 and the change-over valve 42.

§3 Third Embodiment of Electric Automobile 3.1 Basic Structure

Figure 10:
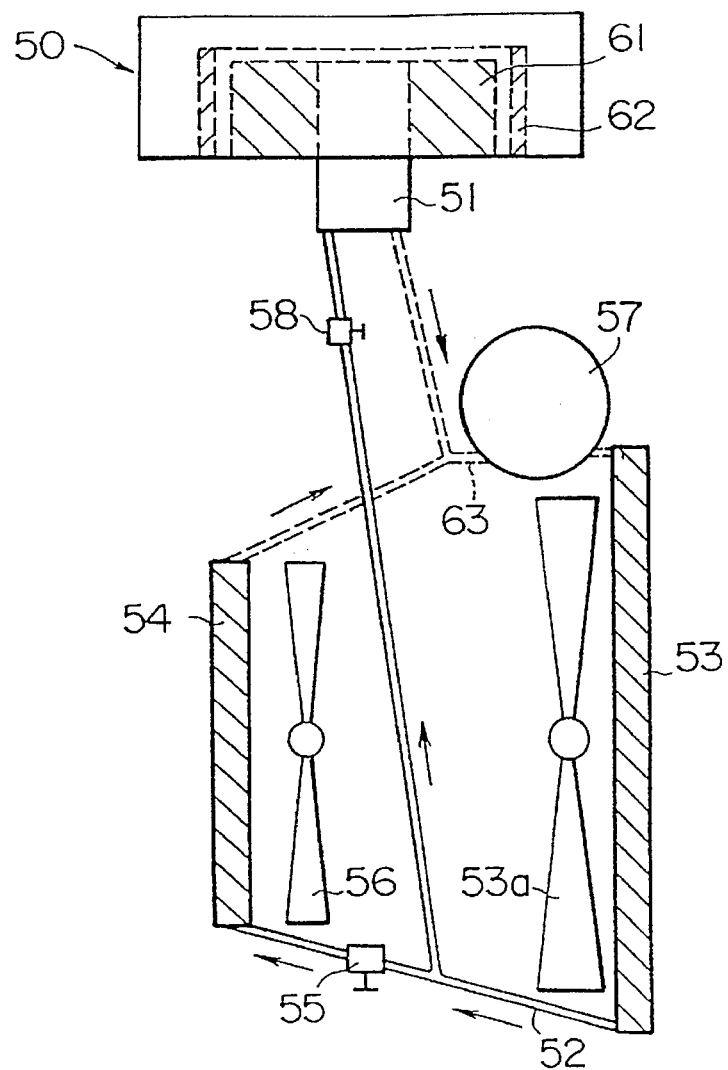
FIG. 10 is a systematically schematic view showing a refrigerating system in a cooling mode of an electric automobile according to a third embodiment of the present invention.
Figure 11:
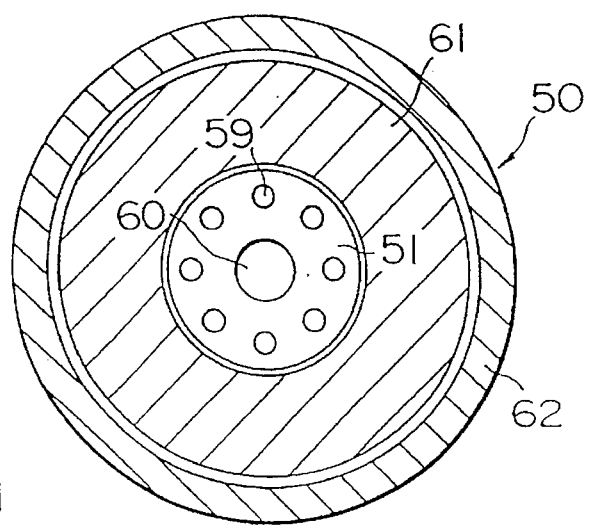
FIG. 11 is a sectional view showing a refrigerant passage of the electric automobile according to the third embodiment shown in FIG. 10.
Figure 12:
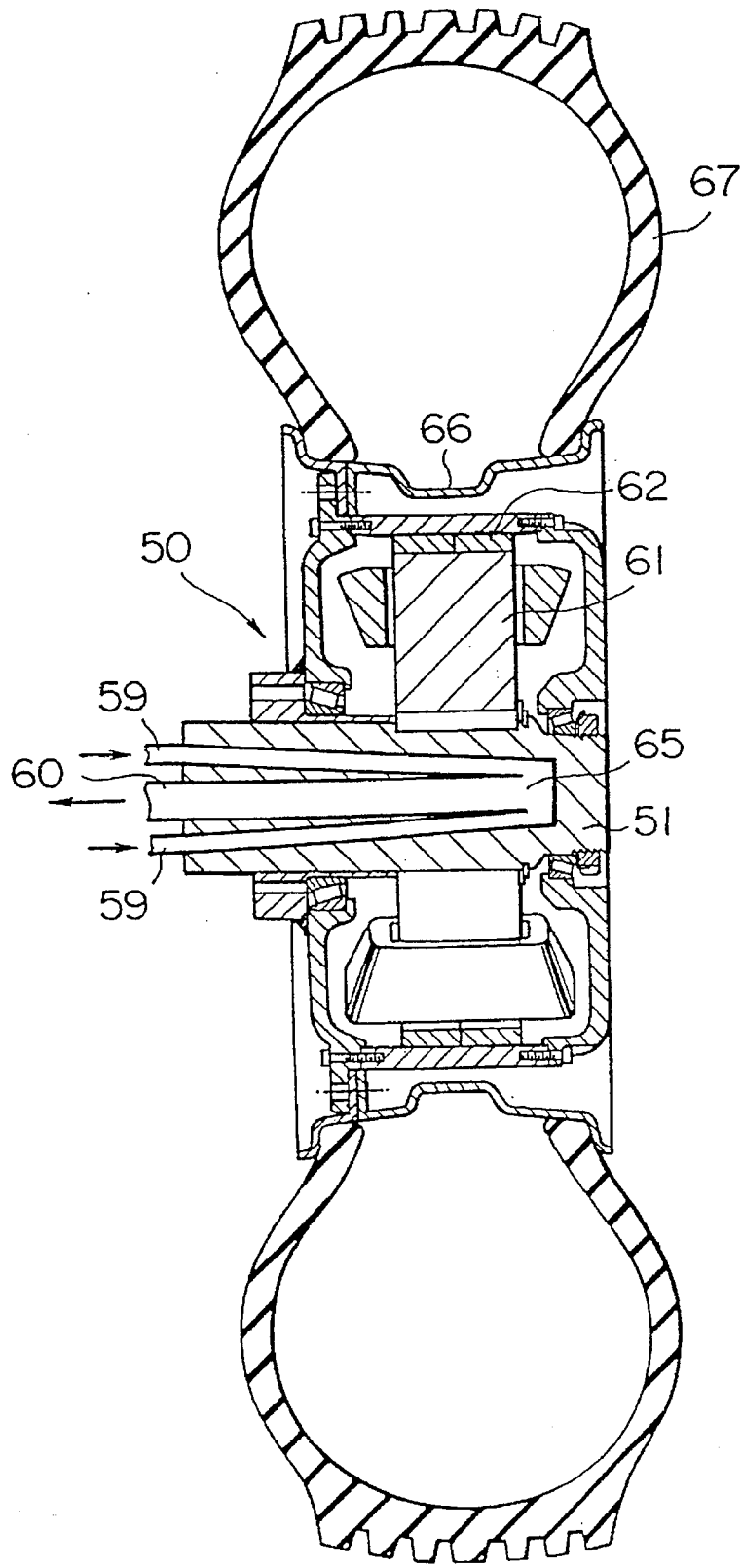
FIG. 12 is a sectional side view showing a wheel driving motor of an electric automobile according to the third embodiment.

FIGS. 10, 11, and 12 show an electric automobile according to a third embodiment of the present invention.

In FIGS. 10, 11, and 12, the electric automobile has a wheel driving motor 50 for each driven wheel. The wheel driving motor 50 is an outer rotor type motor which comprises a stator 61 fixed on a stationary shaft 51 and a rotor 62 provided outside and around the stator 61. FIG. 10 is a partial plan view showing the electric automobile.

In FIG. 10, a gaseous refrigerant is compressed by a compressor 57 and then cooled by an outdoor heat exchanger 53 having a fan 53a to become a low-temperature and high-pressure liquid refrigerant. Thereafter, the liquid refrigerant flows through a refrigerant pipe 52 to a side of an indoor heat exchanger 54 and to the side of the stationary shaft 51 of the wheel driving motor 50. The liquid refrigerant flowing to the side of the indoor heat exchanger 54 is adiabatically expanded by an indoor heat exchanger expansion valve 55 installed just before the indoor heat exchanger 54 to become a low-temperature and low-pressure gaseous and liquid refrigerant. Thereafter, this gaseous and liquid refrigerant cools the air around the indoor heat exchanger 54. The air around the indoor heat exchanger 54 cooled in this manner is blown into the interior of the electric automobile by means of a fan 56.

As shown in FIGS. 11 and 12, the stationary shaft 51 is provided inside the stator 61 of the wheel driving motor 50. The liquid refrigerant flowing to the side of the stationary shaft 51 is adiabatically expanded by a motor expansion valve 58 positioned just before the wheel driving motor 50 to become a gaseous and liquid refrigerant. The gaseous and liquid refrigerant flows into a refrigerant passage 65 formed within the stationary shaft 51 through a plurality of inlet pipes 59. The gaseous and liquid refrigerant flowing into the refrigerant passage 65 cools the stator 61 of the wheel driving motor 50 fixed on the stationary shaft 51. In this case, the stator 61 of the wheel driving motor 50 may be cooled efficiently and rapidly, because the stationary shaft 51 itself functions as an evaporator.

The gaseous and liquid refrigerant is heated by the wheel driving motor 50 to become a gaseous refrigerant, which then passes from the refrigerant passage 65 within the stationary shaft 51 to an outlet pipe 60. Next, the gaseous refrigerant flows to the compressor 57 through a refrigerant return pipe 63. Thereafter the gaseous refrigerant is compressed by the compressor 58 into a state of a high temperature and high pressure. Next the gaseous refrigerant flows to the outdoor heat exchanger 53 again to become a low-temperature and high pressure liquid refrigerant. Thereafter, the steps described above are repeated.

In FIG. 12, a wheel 66 is fixed to the periphery of the rotor 62 for holding a tire 67 directly.

3.2 Variation of Structure

Next, a variation of the electric automobile according to the third embodiment of the present invention will be described with reference to FIG. 13.

Figure 13:
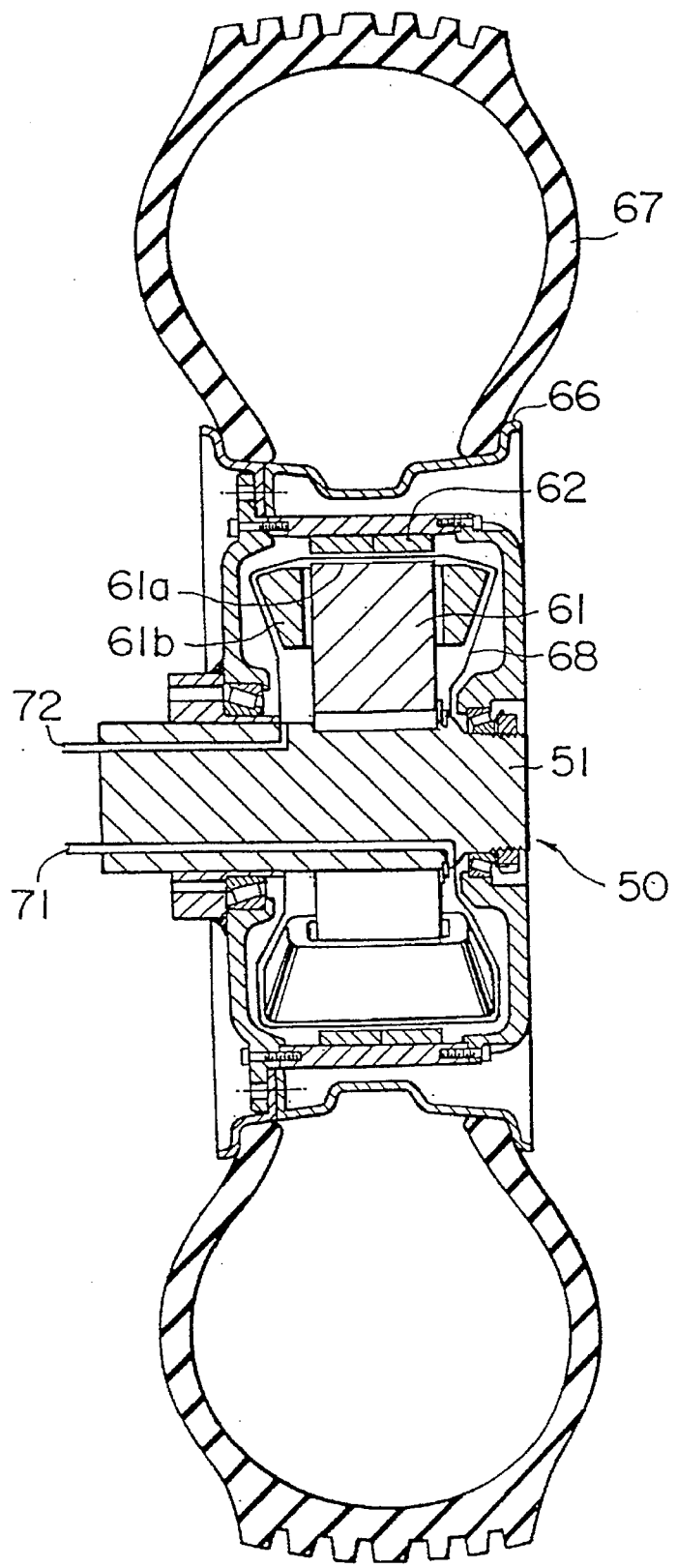
FIG. 13 is a sectional side view showing a wheel driving motor of a variation of the electric automobile according to the third embodiment.

The same reference numerals are used in FIG. 13 in parts corresponding to those in FIG. 12, and detailed descriptions of these parts are omitted.

In FIG. 13, a periphery portion 61a and side portions 61b of the stator 61 are completely surrounded and sealed by a sealing can 68. The stator 61 is fixed on the stationary shaft 51. An inlet pipe 71 and an outlet pipe 72 are provided within the stationary shaft 51 and communicate with the interior of the sealing can 68. In FIG. 13, a refrigerant flowing into the interior of the sealing can 68 through the inlet pipe 71 positively cools the stator 61. The refrigerant within the sealing can 68, after cooling the stator 61, flows out of the outlet pipe 72.

§4 Fourth Embodiment of Electric Automobile

FIGS. 14 to 20 show an electric automobile according to a fourth embodiment of the present invention. This electric automobile has substantially the same structure as the electric automobile of the first embodiment in FIG. 1 or the electric automobile of the second embodiment in FIG. 5 except for variations in the inner structure of a wheel driving motor.

4.1 First Structure of Wheel Driving Motor

A first structure of a wheel driving motor will be described with reference to FIG. 14.

Figure 14:
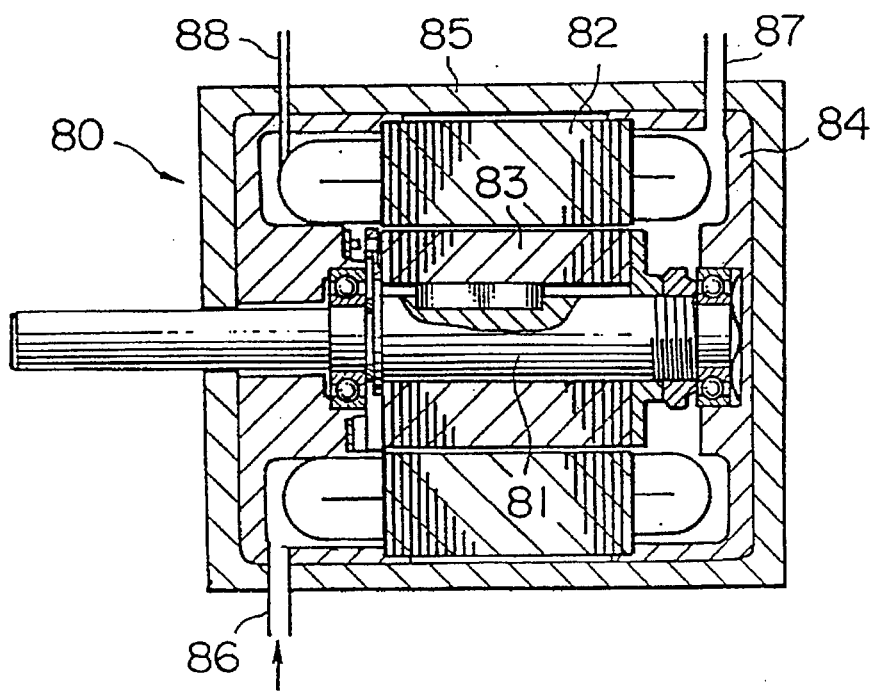
FIG. 14 is a sectional side view showing a first structure of a wheel driving motor of an electric automobile according to a fourth embodiment of the present invention.

As shown in FIG. 14, the wheel driving motor 80 comprises a sealing shell 85, a flange 84 provided within the sealing shell 85, a stator 82 supported by the flange 84, a rotor 83 provided inside the stator 82, and a driving shaft 81 fixed to the inner surface of the rotor 83. An inlet pipe 86 for supplying a refrigerant (such as Freon) into the sealing shell 85 and an outlet pipe 87 for discharging the refrigerant out of the sealing shell 85 are connected to the sealing shell 85. A lead wire 88 is connected to the stator 82 and passes through the sealing shell 85 to extend outside.

In FIG. 14, the refrigerant flowing into the sealing shell 85 through the inlet pipe 86 cools the stator 82 and the rotor 83 respectively within the sealing shell 85 and then flows out through the outlet pipe 87.

4.2 Second Structure of Wheel Driving Motor

A second structure of a wheel driving motor will be described with reference to FIG. 15.

Figure 15:
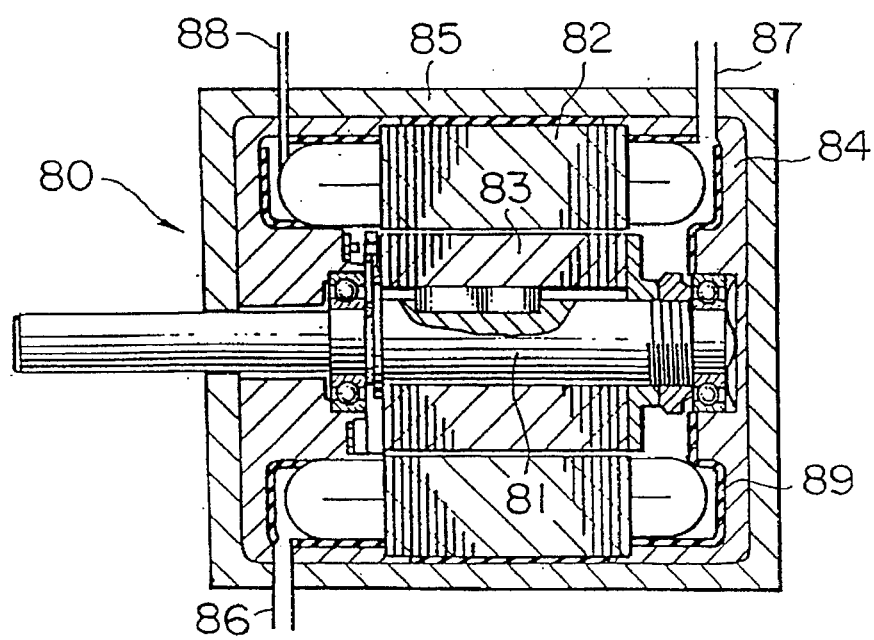
FIG. 15 is a sectional side view showing a second structure of the wheel driving motor of the electric automobile according to the fourth embodiment.

The wheel driving motor 80 in FIG. 15 has substantially the same structure as the wheel driving motor in FIG. 14, except for the provision of a wick 89 on the inner surface of the sealing shell 85 for diffusing efficiently the refrigerant within the sealing shell 85.

In FIG. 15, the refrigerant flowing into the sealing shell 85 through the inlet pipe 86, is diffused within the sealing shell 85 by the capillarity of the wick 89, so that the inside of the sealing shell 85 may be cooled efficiently.

4.3 Third Structure of Wheel Driving Motor

A third structure of a wheel driving motor will be described with reference to FIG. 16.

Figure 16:
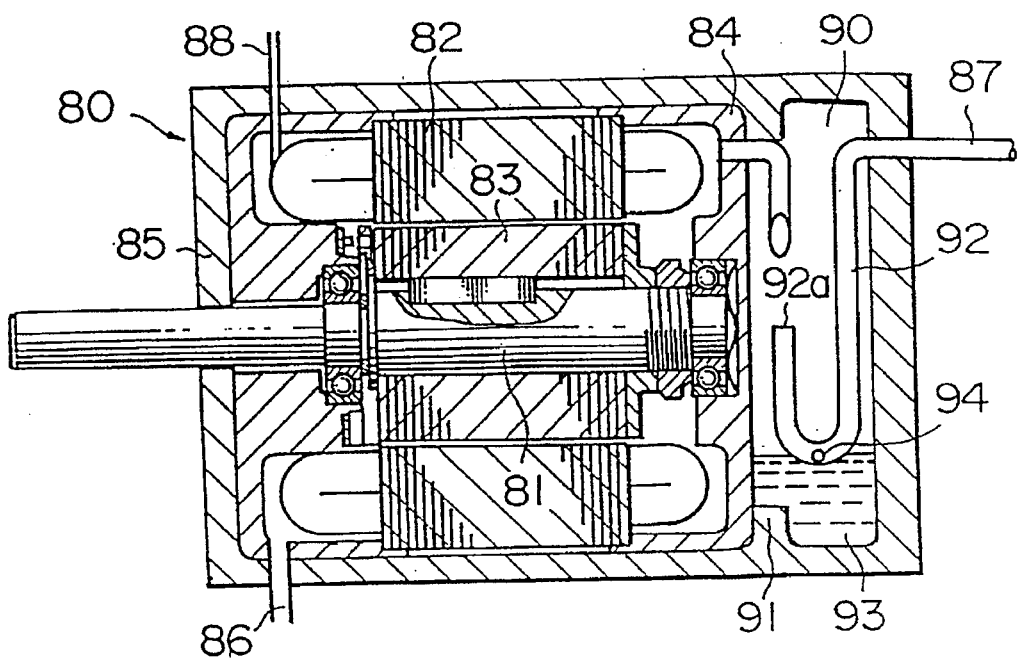
FIG. 16 is a sectional side view showing a third structure of the wheel driving motor of the electric automobile according to the fourth embodiment.

The same reference numerals are used in FIG. 16 for parts corresponding to those in FIG. 14, and detailed descriptions of these parts are omitted. In FIG. 16, the wheel driving motor 80 has a sealing shell 85 which is divided into two chambers by a partition 91. An accumulator 90 is formed within one chamber of the sealing shell 85, and a stator 82, a rotor 83, and a driving shaft 81 are accommodated within the other chamber. A connecting pipe 92 having a U shape is provided within the accumulator 90 and is connected to the other chamber for accommodating the stator 82 etc. The connecting pipe 92 is partially cut and connected to an outlet pipe 87. A liquid refrigerant 93 is stored within the accumulator 90. A metering orifice 94 is formed at the lower end of the U shape connecting pipe 92.

In the wheel driving motor 80 shown in FIG. 16, the refrigerant flows into the sealing shell 85 through the inlet pipe 86 and then cools the stator 82 and the rotor 83 to become a substantially gaseous refrigerant. Next, the refrigerant enters the accumulator 90. The small liquid part of the refrigerant is separated from the gaseous part of the refrigerant within the accumulator 90. The gaseous refrigerant flows into the connecting pipe 92 through a cut end 92a of the connecting pipe 92 and then flows out through the outlet pipe 87. At the same time, the liquid refrigerant is stored within the accumulator 90. The metering orifice 94 of the connecting pipe 92 is positioned at substantially the same level as the surface of the liquid refrigerant 93. The metering orifice 94 is used for sucking the liquid refrigerant 93 in order to replenish the refrigerant when the amount of the gaseous refrigerant entering the outlet pipe 87 becomes small.

4.4 Fourth Structure of Wheel Driving Motor

A fourth structure of a wheel driving motor will be described with reference to FIG. 17.

Figure 17:
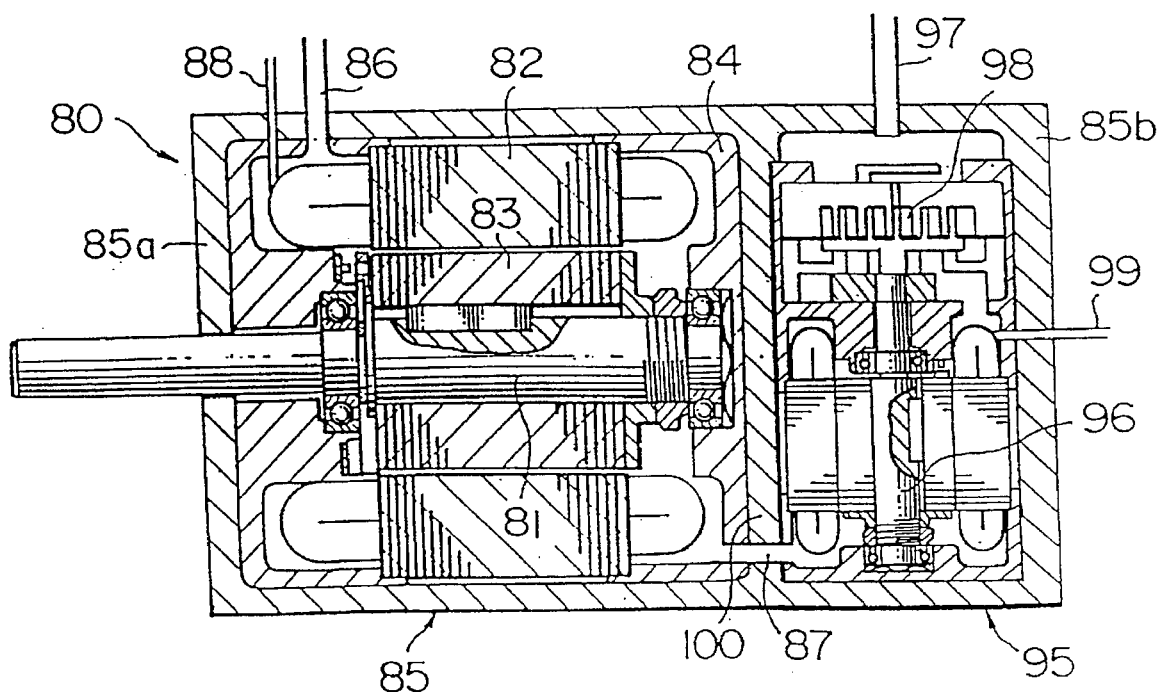
FIG. 17 is a sectional side view showing a fourth structure of the wheel driving motor of the electric automobile according to the fourth embodiment.

The same reference numerals are used in FIG. 17 for parts corresponding to those in FIG. 14, and detailed descriptions of these parts are omitted.

As shown in FIG. 17, the wheel driving motor 80 and a compressor 95 of a refrigerating cycle are jointed together integrally. That is, the common sealing shell 85 is divided into a motor sealing shell 85a and a compressor sealing shell 85b. A compressor motor 96 is provided within the compressor sealing shell 85b, and the outlet pipe 87 of the wheel driving motor 80 communicates with the inside of the compressor sealing shell 85b. Gaseous and liquid refrigerant flows into the motor sealing shell 85a through the inlet pipe 86 and then cools the stator 82 and the rotor 83 respectively. Next, the refrigerant flows into the compressor sealing shell 85b through the outlet pipe 87. Then the refrigerant is compressed by the compressor 98 and discharged from a discharge pipe 97 to subsequent steps after cooling the compressor motor 96. In FIG. 17, reference numeral 99 indicates a lead wire of the compressor motor 96.

4.5 Fifth Structure of Wheel Driving Motor

A fifth structure of a wheel driving motor will be described with reference to FIG. 18.

Figure 18:
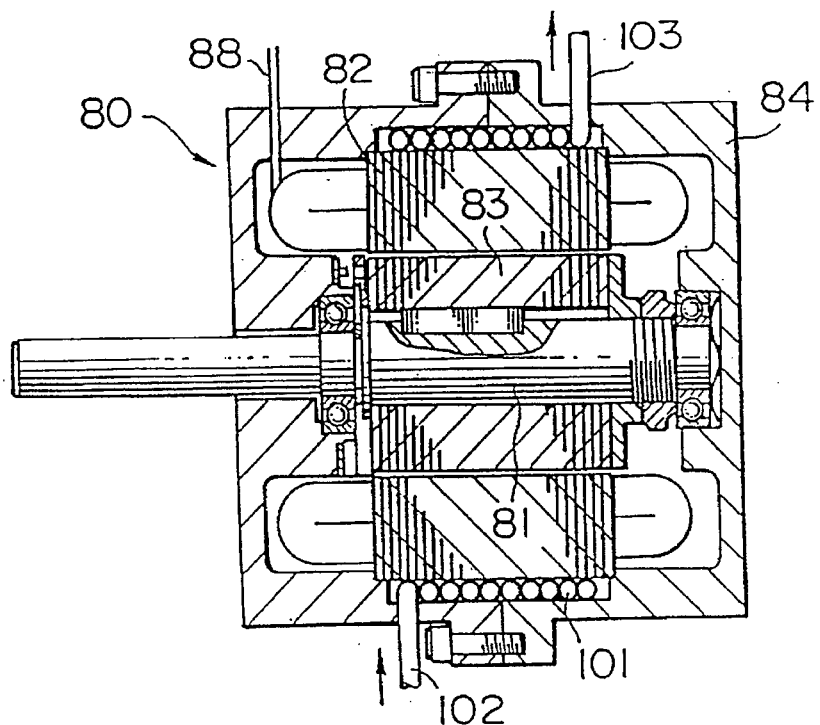
FIG. 18 is a sectional side view showing a fifth structure of the wheel driving motor of the electric automobile according to the fourth embodiment.

As shown in FIG. 18, the wheel driving motor 80 has the stator 82 supported by the flange 84 and the rotor 83 provided inside the stator 82. The rotor 83 is fixed on the driving shaft 81.

A coiled thin pipe 101 in which the refrigerant flows for cooling the stator 82, is wound on the outer surface of the stator 82. The refrigerant flows into the coiled thin pipe 101 through an inlet pipe 102 and then flows out of the coiled thin pipe 101 through an outlet pipe 103. In FIG. 18, the lead wire 88 is connected to the stator 82. The lead wire 88 is passed through the flange 84 to the outside.

4.6 Sixth Structure of Wheel Driving Motor

A sixth structure of a wheel driving motor will be described with reference to FIG. 19.

Figure 19:
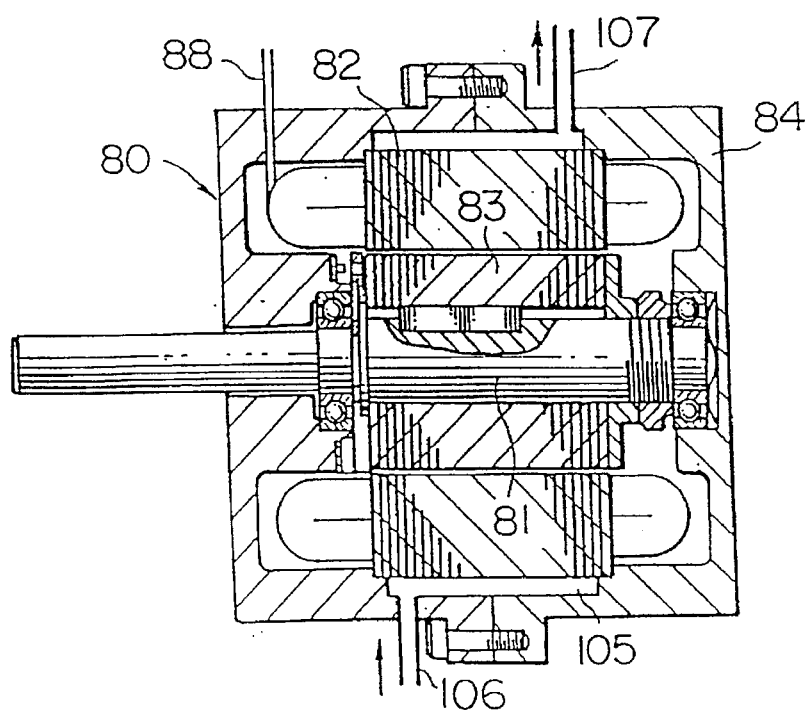
FIG. 19 is a sectional side view showing a sixth structure of the wheel driving motor of the electric automobile according to the fourth embodiment.

The wheel driving motor 80 in FIG. 19 has substantially the same structure as the wheel driving motor in FIG. 18 except for the provision of a jacket 105 in which the refrigerant flows on the outer surface of the stator 82 instead of a winding of the coiled thin pipe 101. In FIG. 19, the refrigerant flows into the jacket 105 through an inlet pipe 106 and then cools the stator 82. Next, the refrigerant flows out of the jacket 105 through an outlet pipe 107.

4.7 Seventh Structure of Wheel Driving Motor

Figure 20:
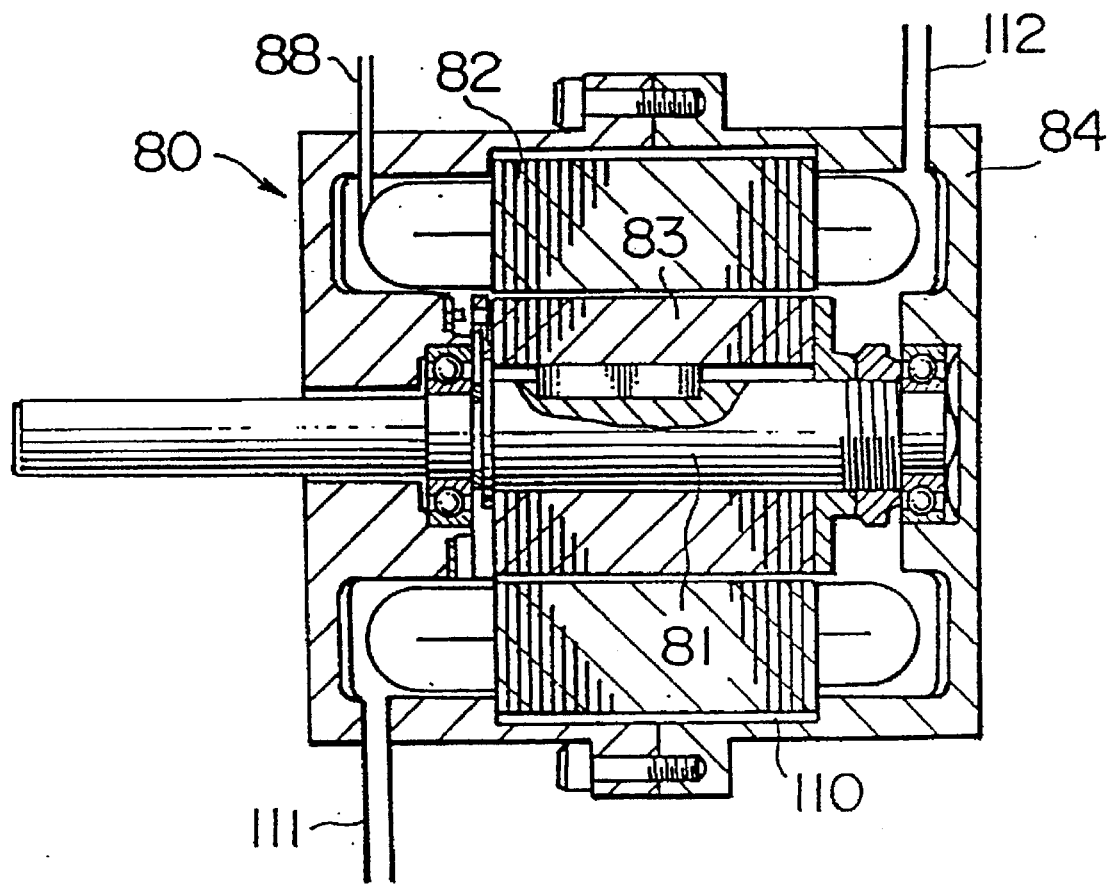
FIG. 20 is a sectional side view showing a seventh structure of the wheel driving motor of the electric automobile according to the fourth embodiment.

A seventh structure of a wheel driving motor will be described with reference to FIG. 20. The wheel driving motor 80 in FIG. 20 has substantially the same structure as the wheel driving motor in FIG. 18 except for the surrounding and sealing of the outer surface, the inner surface and the side surface of the stator 82 by a sealing can 110 instead of the winding of the coiled thin pipe 101. That is, the outer surface, the inner surface and the side surface of the stator 82 are completely sealed by the sealing can 110, except for the inner space where the driving shaft 81 and the rotor 83 are disposed. An inlet pipe 111 for supplying the refrigerant into the sealing can 110, and an outlet pipe 112 for discharging the refrigerant out of the sealing can 110 are connected to the sealing can 110.

INDUSTRIAL APPLICABILITY

An automobile described above may be used broadly as a non-polluting automobile in place of present internal combustion engine type automobiles.

What is claimed is:

1. An electric automobile comprising:

a wheel drive motor for respectively driving at least each of a plurality of driving wheels of the electric automobile; and a refrigerating system in which a refrigerant flows, and which comprises a compressor, an outdoor heat exchanger, an expansion valve, and an indoor heat exchanger connected one after another by refrigerant pipes, said wheel driving motor being provided within the refrigerating system, whereby the wheel driving motor is cooled directly by the refrigerant, said wheel driving motor comprising:

a stator supported by a flange, said stator having an outer surface facing said flange in spaced relation, a rotor provided inside the stator and having a driving shaft, and a coiled thin pipe disposed on the outer surface of the stator, in which the refrigerant for a refrigerating system flows, the coiled thin pipe being provided within a space between the flange and the stator.

2. The electric automobile according to claim 1, wherein the refrigerating system further has a change-over valve whereby the refrigerant flow is made reversible.

3. The electric automobile according to claim 2, wherein the refrigerating system is so constructed that in a cooling mode, the refrigerant is adiabatically expanded by an indoor heat exchanger expansion valve after passing through the outdoor heat exchanger and then cools the air around the indoor heat exchanger, and the refrigerant is adiabatically expanded in parallel by a motor expansion valve after passing through the outdoor heat exchanger and then cools the wheel driving motor, and that, in a heating mode, the refrigerant is adiabatically expanded by the motor expansion valve after passing through the indoor heat exchanger and then cools the wheel driving motor.

4. The electric automobile according to claim 2, wherein the refrigerating system is so constructed that, in a cooling mode, the refrigerant is adiabatically expanded by an indoor heat exchanger expansion valve after passing through the outdoor heat exchanger, and then cools the air around the indoor heat exchanger and the wheel driving motor in series, and that, in a heating mode, the refrigerant is adiabatically expanded by a motor expansion valve after passing through the indoor heat exchanger and then cools the wheel driving motor.

5. The electric automobile according to claim 2, wherein the refrigerating system is so constructed that, in a cooling mode, the refrigerant is adiabatically expanded by an indoor heat exchanger expansion valve after passing through the outdoor heat exchanger and then cools the air around the indoor heat exchanger, and the refrigerant is adiabatically expanded in parallel by a motor expansion valve after passing through the outdoor heat exchanger and then cools the wheel driving motor, and that, in a heating mode, the refrigerant is adiabatically expanded by the motor expansion valve after passing through the outdoor heat exchanger, then cools the wheel driving motor, and next heats the air around the indoor heat exchanger by waste heat from the wheel driving motor.

6. The electric automobile according to claim 1, wherein said coiled thin pipe includes a refrigerant inlet and a refrigerant outlet extending through said flange.

* * * * *